United States Patent [19]

Morin

[11] Patent Number: 4,606,135
[45] Date of Patent: Aug. 19, 1986

[54] DEVICE FOR PRODUCING A FLUIDIZATION

[75] Inventor: Jean-Xavier Morin, Le Creusot, France

[73] Assignee: Framatome & Cie, Courbevoie, France

[21] Appl. No.: 713,679

[22] Filed: Mar. 19, 1985

[30] Foreign Application Priority Data

Mar. 20, 1984 [FR] France ................................ 84 04272

[51] Int. Cl.⁴ ............................................ F26B 17/10
[52] U.S. Cl. ................................... 34/57 B; 34/57 A; 34/57 C
[58] Field of Search ................... 34/57 A, 57 B, 57 C; 432/15, 58; 110/245

[56] References Cited

U.S. PATENT DOCUMENTS 2,812,592  11/1957  Knibbs et al.
3,721,608  3/1973  Saller et al. .......... 34/57 A
4,197,085  4/1980  Caplin ................... 432/58
4,203,804  5/1980  Janning et al. ........ 34/57 A
4,344,372  8/1982  Chronowski .......... 34/57 A
4,402,665  9/1983  Korenberg ............ 432/58

FOREIGN PATENT DOCUMENTS 2148897  3/1973  France .
1111097  4/1968  United Kingdom .
1346168  2/1974  United Kingdom .

Primary Examiner—Larry I. Schwartz

[57] ABSTRACT

The device is disposed at the base of a fluidization chamber for the uniform distribution of a gaseous fluid throughout the section of the chamber, and comprises a multitude of small parallel tubes (12) provided with radial perforations and connected to manifolds (11a, 11b ...) for a looped supply of gaseous fluid to the tubes. The invention is particularly applicable to industrial fluidized beds for processing materials.

8 Claims, 8 Drawing Figures

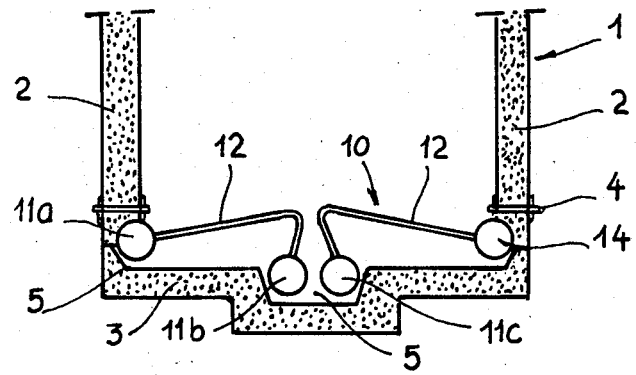
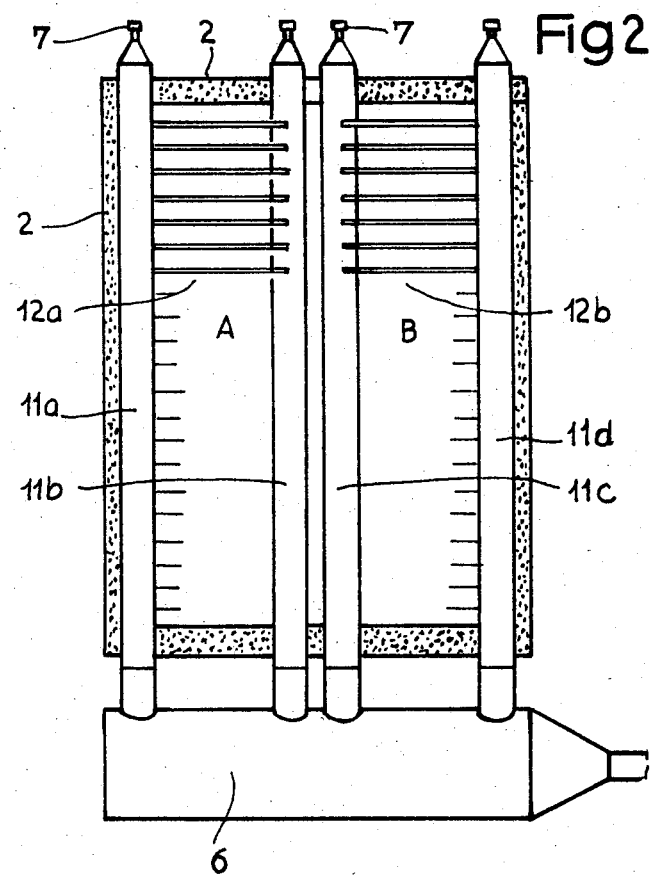
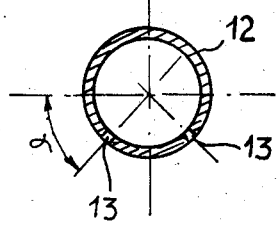

4,606,135

DEVICE FOR PRODUCING A FLUIDIZATION

FIELD OF THE INVENTION

The present invention relates to a device for producing a fluidization, more particularly applicable to industrial fluidized beds for processing materials.

BACKGROUND OF THE INVENTION

Fluidization chambers for processing materials comprise at the base a device for distributing a gaseous fluid throughout the section of the chamber and for producing a fluidization of a particulate material fed to said chamber.

In the field of industrial fluidized beds for processing materials, it is known to employ as the fluidization device planar plates which are perforated so as to constitute an even network and which are provided with pipes surmounted by a mushroom-shaped cap or with thick pipes provided with radial apertures. This system has the advantage of being protected against the introduction of solid particles in the main gaseous fluid supply conduit. On the other hand, this structure in which the plate must resist large thermal and mechanical loads by its rigidity as concerns bending and in which multiple mushroom caps must be constructed, results in high constructional costs.

It is also known to employ as a device for producing a fluidization planar plates which are perforated and provided with venturi. But in order to be protected against introduction of solid particles in the supply conduits, a fluidization agent introducing siphon or trap must be provided. It is then necessary to carry out a regular inspection to ascertain whether the venturi is or is not blocked by particles, and this requires an individual supply of fluidization agent to each venturi. This mode of construction therefore results in a modification of equilibrating, insulating and deblocking means which results in large pressure drops.

Further, these devices as operate either in a dense bed or a circulating bed and they do not permit passing from one field of fluidization to the other with the same apparatus. For this purpose, a device is known for producing fluidization which is formed by a grid including a first assembly of passageways connected to a gaseous fluid supply system and a second assembly of complementary passageways connected to another gaseous fluid supply system. The two assemblies are supplied separately or simultaneously, depending on the desired mode of fluidization. This double arrangement consequently multiplies the inspection and control means, and increases the production costs.

SUMMARY OF THE INVENTION

The invention therefore concerns a device for producing a fluidization for the industrial processing of materials which is particularly simple to construct, very cheap and which avoids the aforementioned drawbacks while it is very flexible in operation.

According to the invention, the device, disposed at the base of the fluidization chamber for the uniform distribution of a gaseous fluid through the section of said chamber, comprises a multitude of small parallel tubes provided with radial perforations and connected to manifolds for a loop supply of gaseous fluid to said tubes.

According to another feature of the invention, the perforation are directed downwardly of the fluidization chamber at a given angle and are arranged either in pairs on the section of the tubes or in staggered relation.

BRIEF DESCRIPTION OF THE DRAWINGS

The features of the invention will be apparent more particularly from the following description which is given by way of example with reference to the accompanying drawings in which:

FIG. 1 is a partial vertical sectional view of a fluidization chamber provided with the fluidization producing device according to the invention.

FIG. 2 is a top plan view of the chamber shown in FIG. 1.

FIG. 3 is a cross-sectional view to an enlarged scale of a tube of the fluidization device.

DETAILED DESCRIPTION

Figure 4:
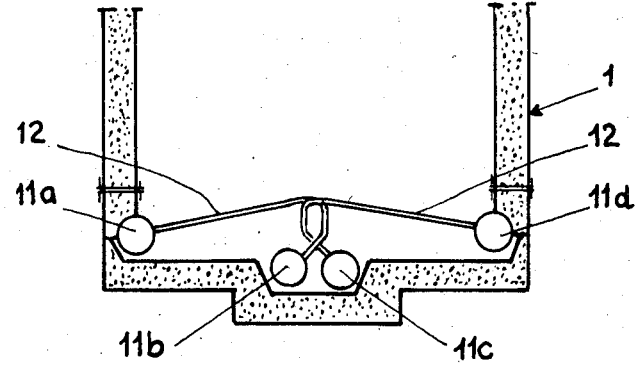
FIG. 4 is a partial vertical sectional view of another embodiment of the fluidization device.

With reference first of all to FIGS. 1 and 2, there is shown a fluidization chamber 1 for the industrial processing of particulate materials having a parallelepipedic shape and including lateral walls 2 of refractory material and a bottom wall 3 also of refractory material. This bottom wall 3 is connected to the lateral walls 2 for example by connecting bricks 4 which can be easily taken apart.

Installed at the base of the chamber 1 and above the bottom wall 3 is the devica 10 for producing fluidization. This device comprises means for supplying a gaseous fluid, for example air, formed by a plurality of parallel manifolds 11a, 11b . . . which extend across the chamber 1. They are arranged on the bottom wall 3 in such manner that a manifold 11a–11d is disposed laterally on each side of the chamber 1 and two other manifolds 11b–11c are placed in the centre of the chamber. Further, they are inserted in cavities 5 provided inside the refractory walls 2-3 of the chamber 1 so that they are protected against damage from erosion or corrosion produced by the particulate or powdered material.

Each manifold 11 is connected outside the chamber 1, at one end, to a main gaseous fluid supply conduit 6, and has at the other end a valve 7. This main conduit 6 can be placed at a certain distance from the chamber 1 or directly flat against the latter so as to reduce pressure drops and reduce the overall size of the chamber. It may also be directly connected to a fan (not shown) for supplying gaseous fluid.

For the purpose of achieving a uniform distribution of the gaseous fluid at the base of the chamber 1 and covering the entire area of the fluidized bed, the device producing fluidization comprises a plurality of small parallel tubes 12 which are disposed transversely in respect to the manifolds 11a, 11b. The tubes 12 are connected to the manifolds in two parallel rows A-B so the tubes 12a of the row A are connected to the manifolds 11a–11b and the tubes 12b of the row B are connected to the manifolds 11c–11d.

Each small tube 12 is provided with radial perforations 13 (FIG. 3) which are spaced apart along the length of the tube in accordance with a pitch depending on the desired mode of fluidization. These perforations 13 are directed downwardly of the fluidization chamber 1 at an angle "α" between 30° and 60° to the horizontal, so as to be protected against possible introductions of solid particles therein. Further, these perforations 13 may be arranged in pairs on the section of the tube 12 or in staggered relation.

The spacing between each tube 12 is according to a pitch depending on the desired mode of fluidization. The tubes 12, on one hand, have an "L" shape so as to allow their free expansion under the simultaneous effect of the circulation of the gaseous fluid and circulation of the particulate material, and, on the other hand, are slightly inclined to the horizontal for the discharge under the effect of gravity of solid particles which may have been introduced.

The arrangement of the manifolds 11a, 11b . . . on each side and in the center of the fluidization chamber 1 enables the length of the tubes 12 to be limited so as to protect against the effects of axial buckling and vibrations and also ensures a looped supply of fluid to said fluidization tubes, so as to reduce pressure differences between the perforations 13 on the most remote tubes and consequently decrease differences in the introduced rates of flow.

Figure 5:
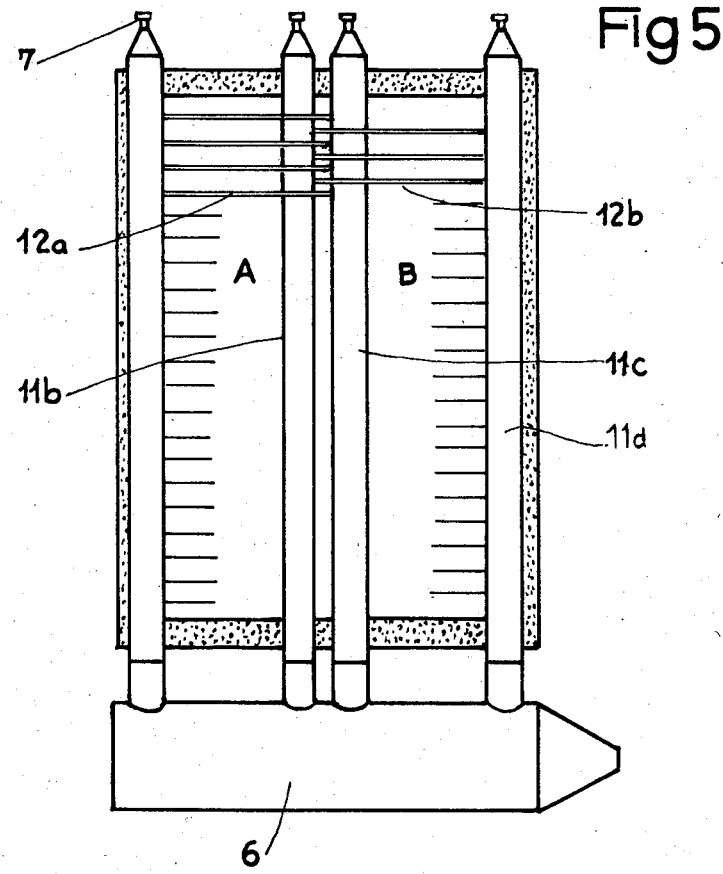
FIG. 5 is a top plan view of the device shown in FIG. 4.

In FIGS. 4 and 5, which represent another embodiment and in which there is seen the fluidization chamber 1 and the manifolds 11a, 11b . . . the arrangement of the tubes 12 is different. Indeed, the tubes 12 of each row A-B are imbricated in each other so as to improve the uniform distribution of the gaseous fluid at the base of the fluidization chamber. It is also possible to connect the tubes 12a of the row A to the manifolds 11a and 11c, and the tubes 12b to the manifolds 11b and 11d.

Figure 6:
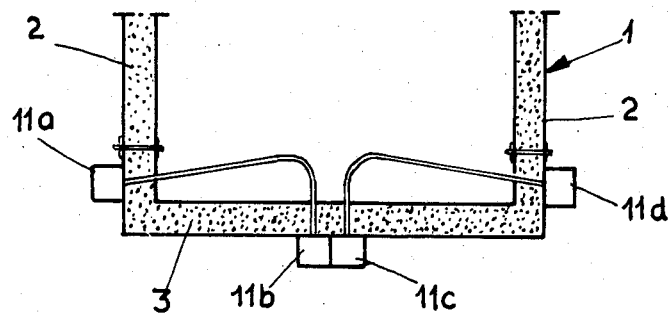
FIGS. 6 to 8 are views of several other embodiments of the fluidization device.

In FIG. 6, the manifolds 11a–11b . . . are disposed outside the walls of the fluidization chamber 1 and thereby provide an improved protection of the manifolds against erosion and corrosion of the particulate material of the fluidized bed.

Figure 7:
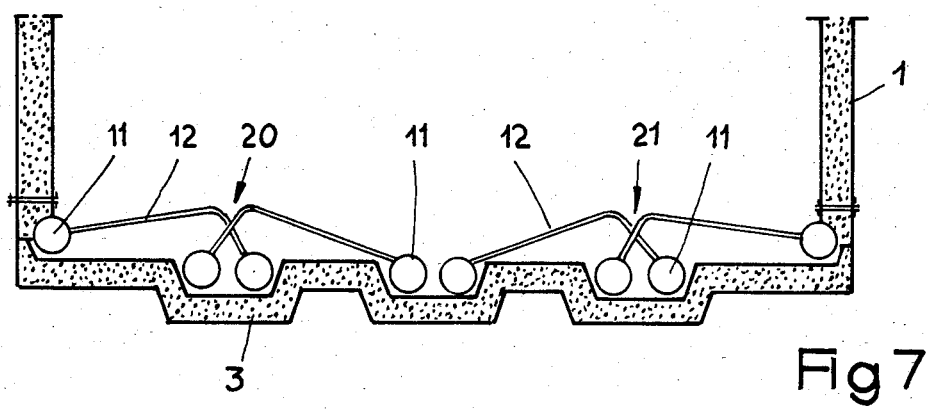

In the case where the area of the chamber 1 is particularly large (FIG. 7), the fluidization device may be arranged in the form of a plurality of juxtaposed modules 20–21 on the bottom wall 3 of the chamber and each comprising an assembly of manifolds 11 and small tubes 12.

Figure 8:
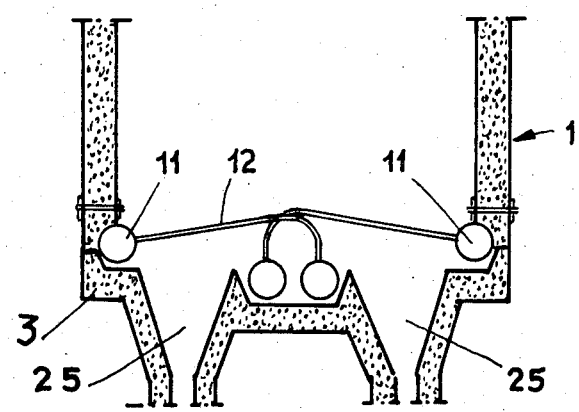

For the discharge under the fluidized bed of large particles or incombustible objects which have been introduced with the fuel, the bottom wall 3 of the fluidization chamber 1 may have a plurality of discharge points 25 which are evenly spaced apart and arranged in the form of hoppers (FIG. 8).

The device for producing fluidization described hereinbefore in the various embodiments has many advantages. Firstly, it is simple to construct and very cheap and avoids the use of a perforated support plate of a sophisticated material and yet results in a uniform distribution of the fluidization agent.

Further, the arrangement of the tubes is such that it permits the recovery under the effect of gravity in the manifolds of the particles introduced through the perforations of the tubes. In these manifolds, the particles are periodically discharged by opening the valves 7.

By means of this arrangement, it is also possible to reduce to a minimum the layer of insulating refractory material constituting the bottom of the fluidized bed, the material of the bed then constituting partly the insulating refractory means.

Lastly, the easy disassembly of the bottom wall of the fluidization chamber permits an easy access to the manifolds and the tubes and possibly effecting repairs.

It must be understood that the scope of the invention is not strictly limited to the embodiments described by way of example but also encompasses embodiments which differ therefrom in details and constructional variants or equivalent means.

I claim:

1. A device for producing a fluidization of a particulate material, said device being disposed at the base of a fluidization chamber and comprising gaseous fluid distributing means which include manifolds, small parallel tubes provided with radial perforations and connected to the manifolds, said tubes being transversely arranged relative to the manifolds in a plurality of parallel rows and spaced apart at a pitch which is determined for a uniform distributin of the gaseous fluid at the base of the fluidization chamber and for covering the entire area of the fluidized bed, the tubes of each row having an "L" shape and being inclined relative to the horizontal so as to discharge solid particles and satisfy criteria of mechanical and thermal performance.

2. A device according to claim 1, wherein the perforations are disposed in pairs.

3. A device according to claim 1, wherein the perforations are disposed in staggered relation.

4. A device according to claim 1, wherein the tubes are in imbricated relation to one another.

5. A device according to claim 1, wherein the manifolds are parallel to each other and extend across the fluidization chamber, and each manifold is connected adjacent one end of the manifold outside said chamber to a main gaseous fluid supply conduit and each manifold includes adjacent an end opposed to said one end a valve for discharging solid particles.

6. A device according to claim 5, wherein one of said manifolds is disposed laterally on each side of said chamber and two of said manifolds are placed at the center of said chamber.

7. A device according to claim 6, wherein said manifolds are inserted in cavities provided in refractory walls of said chamber.

8. A device according to claim 1, arranged in the form of a plurality of modules which are in juxtaposed relation to each other on a bottom of said chamber, each module comprising an assembly of manifolds to which the small tubes are connected.

* * * * *